United States Patent [19]

Hamar

[11] 4,382,680

[45] * May 10, 1983

[54] APPARATUS AND PROCESS FOR SWEEPING A FLAT OPTICAL LIGHT PLANE

[76] Inventor: Martin R. Hamar, 70 Linden Tree Rd., Wilton, Conn. 06897

[*] Notice: The portion of the term of this patent subsequent to Oct. 27, 1998, has been disclaimed.

[21] Appl. No.: 313,965

[22] Filed: Oct. 22, 1981

Related U.S. Application Data

[63] Continuation-in-part of Ser. No. 78,933, Sep. 26, 1979, Pat. No. 4,297,031.

[51] Int. Cl.³ .......................... G07B 11/26; G02B 7/18
[52] U.S. Cl. ...................................... 356/247; 350/6.4; 350/287; 356/138; 356/248
[58] Field of Search ............... 356/138, 153, 247, 248, 356/250, 255; 350/6.4, 287

[56] References Cited

U.S. PATENT DOCUMENTS

| | | | |
|---|---|---|---|
| 2,633,050 | 3/1953 | Baker | 356/250 |
| 3,684,381 | 8/1972 | Zoot | 356/138 |
| 3,771,876 | 11/1973 | Ljungdahl et al. | 356/138 |

FOREIGN PATENT DOCUMENTS

| | | | |
|---|---|---|---|
| 2445635 | 4/1976 | Fed. Rep. of Germany | 356/138 |
| 136,417 | 7/1979 | German Democratic Rep. | 350/6.4 |

OTHER PUBLICATIONS

"Penta Prism Behavior in Optical Tooling Techniques, Effect of Changes in Penta Prism Position and Alignment," No. 1, in a series of Technical Papers for the Advancement of Metrology, Engis Equipment Company, 431 South Dearborn Street, Chicago, Ill.

*Primary Examiner*—Vincent P. McGraw
*Attorney, Agent, or Firm*—Hedman, Casella, Gibson, Costigan & Hoare

[57] ABSTRACT

A process and apparatus for sweeping a flat optical light plane perpendicular to a primary input laser beam for use in precise alignment applications includes rotatably mounting a penta prism onto a spindle such that the laser beam intersects the entrance face of the penta prism. In addition, the path of the laser beam intersects the actual axis of rotation of the spindle at a designated point which is positioned as a function of the geometry of the penta prism, and the first reflecting surface of the penta prism is located intermediate the laser device and said designated point. In operation, rotation of the penta prism about the spindle results in the development of a flat, true optical light plane.

6 Claims, 6 Drawing Figures

APPARATUS AND PROCESS FOR SWEEPING A FLAT OPTICAL LIGHT PLANE

CROSS REFERENCE TO RELATED APPLICATION

This application is a continuation-in-part of copending U.S. patent application Ser. No. 078,933, filed Sept. 26, 1979, now U.S. Pat. No. 4,297,031, issued Oct. 27, 1981 the entire disclosure of which is hereby incorporated by reference.

DESCRIPTION OF THE PRESENT INVENTION

The present invention is directed to an apparatus and process for deflecting a laser beam through a precise 90° angle utilizing a penta prism which is rotated to sweep out a flat plane that is perpendicular to the input laser beam. Examples of its application can be in checking of squareness of two columns or aligning a vertical surface to a horizontal line.

The apparatus of the subject invention is capable of being erected simply and efficiently, such that the penta prism may be rotated to sweep out a true, flat plane perpendicular to the primary laser beam, after which the penta prism module of the subject apparatus may be relocated anywhere along the primary laser beam and re-erected to quickly and simply sweep out a second plane perpendicular to the laser beam and parallel to the first plane.

As an example of an alignment application requiring the generation of a plurality of parallel planes disposed perpendicular to a laser beam is in a large paper mill, steel rolling mill, or in a printing press apparatus, wherein a number of rolls are set in a frame, and wherein it is essential that the longitudinal axes of the several rolls be fixed parallel to one another. If the axis of one roll is skewed relative to another roll, the paper or steel being passed between the rolls will tend to vary in thickness or wander to one side or the other, thereby decreasing the quality of the resulting product. Although it is a relatively simple matter to level each roll from side to side using conventional level apparatus, it is difficult to control the disposition of the axes of the rolls so that they are parallel in azimuth.

Utilizing the process and apparatus of the subject invention, it is merely necessary to set up a primary laser beam along the side of the machine having the plurality of rolls, and then employ the subject apparatus to generate true, flat optical light planes perpendicular to the primary output laser beams. Suitable targets may then be mounted on opposite ends of each roll, and upon the intersection and alignment of the flat optical light plane with each target, a roll will be adjusted in azimuth to be aligned perpendicular to the light beam, and thus parallel to the other rolls in the machine.

Further objects and advantages of the invention will become apparent from a reading of the detailed description of the invention taken in conjunction with the drawings in which.

In the prior art, in the use of a penta prism for sweeping a plane perpendicular to a light source, such as a laser beam, both an optical displacement and a geometric displacement of the beam are usually experienced. Of course, where absolutely perfect conditions exist, and where the penta prism is rotated about the input beam and the penta prism is perfectly square such that it has no wobble (e.g., its axis of rotation is exactly coincident with the input laser beam), the output beam will sweep a flat plane. However, if that same penta prism is rotated basically about the input beam, but because the axis of rotation of the penta prism is not exactly coincident with the input laser beam, then optical and geometric translation errors will occur. Similarly, if the penta prism is rotated about the input beam and also wobbles about the axis of the exit beam, then well known angular errors will also occur in the beam. If in the process of rotating about the input beam, the penta prism also wobbles about an axis which is perpendicular to the input output beam, then optical and geometrical translation errors can also occur resulting in an unflat or waffle-shaped plane.

Figure 1:
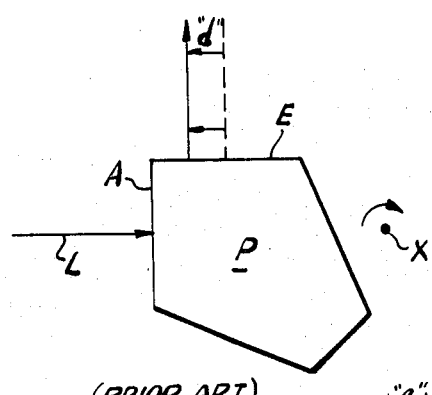
FIG. 1 is a schematic illustration of the translational error in the output beam of a rotating penta prism as a result of the "optical effect;"

The first of these displacements or errors is as a result of the "optical effect." As illustrated in FIG. 1, light beam L is input to the entrance face A of penta prism P such that the output beam should be along the dotted line extending perpendicular to exit face E. However, a translational shift of the output beam is effected due to a wobble of the penta prism about an axis X, which is perpendicular to the input output beam, i.e., perpendicular to the plane of the paper in FIG. 1. This displacement, designated by "d," of the beam is due to the fact that the penta prism is made of glass, it is an optical medium, and has an optical density, and the displacement "d" of the output beam occurs purely because of rotational effect of penta prism P, about the axis X. The displacement "d" will be to the left as shown in FIG. 1 when the direction of rotation of penta prism P is as shown in FIG. 1.

Figure 2:
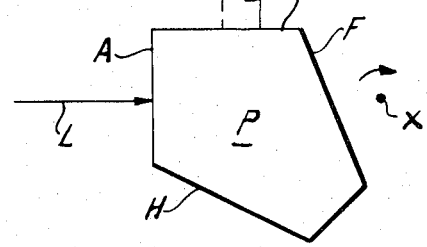
FIG. 2 is a schematic illustration of the translational error in the output beam of a rotating penta prism as a result of the "geometric effect;"

Referring to FIG. 2, as the penta prism is rotated in the same direction about the axis X perpendicular to the laser beam L, there will also occur a "geometric error" which is composed of two different components. Fundamentally, the "geometric error" will be in the opposite direction from the "optical error." In magnitude, the "geometric error" is proportional to the position of the axis X relative to the first reflecting face F of the penta prism P. The "geometric error" is designated by the letter "g" in FIG. 2, and is brought about in part because the first reflecting surface F is moved laterally relative to the input beam L, and partly because in the process of the penta prism P being tilted at a different angle relative to the input beam, the first reflected beam within the penta prism takes a different path through the prism than it did when the prism was square. In other words, the reflected beam hits a different place on the second reflecting surface, and thus, upon reflection, the angular error is completely corrected but there is a displacement of the beam because of its path from the first reflection face F to the second reflection face H is different from what it would be in a square or normal situation.

The sum results of the "optical" displacement and the "geometric" displacement is that the resulting optical light plane which is swept by rotation of the penta prism P is not flat or true, and therefore is not acceptable for accurate work in those applications where the tolerance limits have to be more accurate than 1/16 of an inch in one hundred feet. Obviously, in order to use a penta prism to sweep a truly accurate plane on the order of 1,000ths of an inch or better, in 50 or 100 feet, it would be necessary to align the axis of rotation of the penta prism P so that it is exactly coincident with the input or the optical axis of the input beam L. In order to accomplish this, it would be necessary to laterally shift the axis of rotation of the penta prism so that it was precisely centered on the laser beam at two points which are separated from one another along the axis of rotation of the penta prism. In other words, it would be necessary to have two coordinated and associated mechanisms to perform this adjustment so that the penta prism axis of rotation is exactly coincident with the input optical axis. This is very difficult to achieve in practice and failure to cause this coincidence to happen in the field would result in an unflat plane which would cause serious measurement errors. Furthermore, such errors would be the kind of errors that the operator would not know existed because he didn't see the shift of the beam. To accomplish the specific alignment such that the axis of rotation of the penta prism is coincident with the optical axis of the input beam is extremely time-consuming and very difficult to achieve accurately in practice. Thus, even though certain applications such as in machine tooling and in the aircraft industry require an absolutely flat plane generator, the difficulty in setting up the penta prism to achieve a true flat plane has precluded the use of the penta prism at remote locations from the light source in the prior art.

Accordingly, it is the primary object of the subject invention to provide a new and improved apparatus and a process for using same in order to generate a true flat optical light plane perpendicular to a primary input laser beam, without having to align the axis of rotation of the penta prism coincident with the primary input laser beam.

It is a further object of the subject invention to provide a new and improved apparatus and process which is simple to operate, accurate, and which may be readily erected and employed in order to generate a flat optical light plane at several remote locations along the length of the input laser beam.

Figure 3:
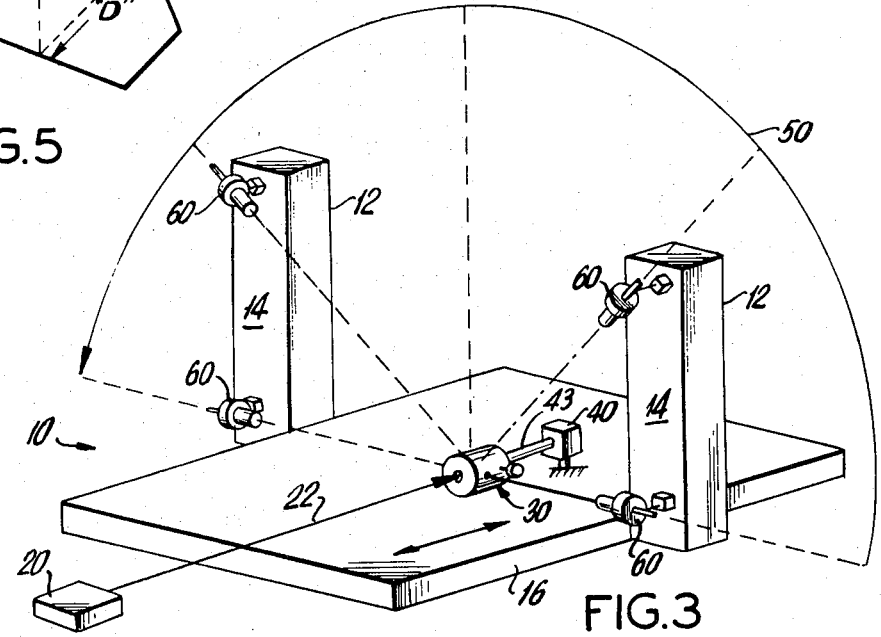
FIG. 3 is a perspective schematic view of the apparatus of the subject invention as employed for aligning columns of a machine tool relative to a base plate.

FIG. 3 illustrates a moving table type of machine 10 including double columns 12, 12. It is desired the faces 14, 14 of the two columns 12, 12 be in the same plane and that that plane be perpendicular to the line of motion of the base plate 16. A laser device 20 having a primary laser beam 22 is adjusted so that the beam 22 is parallel to the line of motion of the base plate 16. A penta prism module unit 30 is then fixedly mounted to a spindle module 40 which is fixed to base plate 16, and erected according to the standard procedure. Once that is accomplished, then the operator need only turn the prism module 30 about the axis of rotation of the spindle to sweep out a true flat plane 50 that is perpendicular to the input laser beam 22. Targets 60 are fixed to the faces 14 of the columns 12 and are used to adjust the position of the columns so that the faces 14, 14 are coplanar and perpendicular to the primary laser beam.

Figure 4:
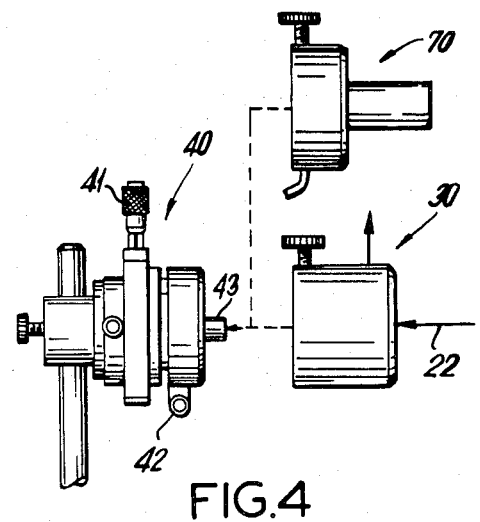
FIG. 4 is an elevational perspective view of the apparatus of the subject invention.

FIG. 4 illustrates the apparatus of the subject invention. Spindle module 40 is mounted on a magnetic base post for connection to a base plate or the like, and is adapted to receive two other modules. One module is a target module 70 while the other module is the penta prism module 30. The latter and the target module 70 are mounted interchangeably on the spindle 40.

In operation, the target module 70 is mounted on the spindle 40 and the entire spindle is tilted so that a reflection of a square piece of glass located in front of the target goes back into the output holes of the laser device 20. It is a simple operation and the operator then uses X-Y micrometers 41, 42 on spindle module 40 to center the target 60 itself on the input laser beam 22. The operator then turns the target on 180° and removes half the error, if any, that he observed, thereby placing the actual axis of rotation of the spindle 43 perfectly centered on the laser beam. The operator then removes the target module 70 having now accomplished the relatively simple required alignment of the spindle 43 and replaces it with the penta prism module 30 which is tightened on the spindle and then the entire spindle is rotated as needed (see FIG. 3) to sweep out the flat reference plane 50.

Figure 5:
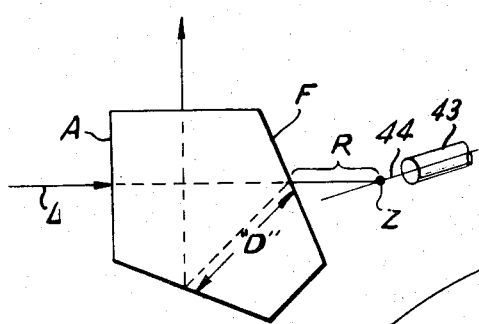
FIG. 5 is a schematic view of the dimensional relationship of the elements of the apparatus of the subject invention.

FIG. 5 shows the dimensional relationship of the subject invention between the penta prism, the laser beam L, the axis of rotation 44 of the spindle 43, and the point Z of intersection of axes L and 44 which is located a distance relative to the first reflecting surface F of the prism P. The two modules 30, 70 discussed above are constructed in such a way that if the target module 70 is placed on the spindle 43, and the spindle adjusted as described above, and point Z occurs, that is the point of intersection between the axis 22 of the laser beam L and the axis 44 of the spindle, the target module may then be taken off the spindle and the penta prism module 30 placed on the same spindle. At such time, the apparatus of the invention is constructed such that the first reflecting surface F of the prism is a distance R in front of where the cell plane of target module was mounted on the spindle.

Distance R is the distance between the face of the first reflecting surface of the prism and the point Z about which the penta prism is rotated in order to achieve a flat, true optical light plane perpendicular to the axis 22 of the laser beam. This distance R may be calculated utilizing the following relationship.

$$R = D(1.707 - 3.414[1 - (1/N')]) \tag{1}$$

where:
D is the distance that the beam traverses within the prism between the first reflecting surface F and the second reflecting surface H (see FIG. 5) (d is equal to the length of the input face A when the beam 22 passes centrally through the input face); and
$N'$ is the index of refraction of the prism.

Equation (1) represents a refinement of the corresponding relationship disclosed in the above mentioned parent application, and thus provides a more accurate determination of R.

The fundamental principle of the subject invention is that the translational optical error and the geometric translational error are equal in magnitude and in opposite direction, and hence cancel if the axis of rotation of the prism is located at point Z which could be termed a point of compensation.

The same principle applies equally to a hollow penta prism with a difference that the simplified formula for calculating the distance R is as follows:

$$R = 1.707D \qquad (2)$$

which also represents a refinement over the corresponding relationship expressed in the above mentioned parent case.

In the case of a hollow prism, it should be understood that there is no optical error because there is no glass involved in the prism, just two mirrors. It should be further understood that the geometric error is actually composed of two components. The two components are opposite in direction for a given angle of rotation if the point of compensation is located behind the first reflecting face by a distance R as defined in the formula above.

In summary, it has been determined that in the case of the hollow prism, there two geometric errors that are cancelling whereas in the case of a solid prism, an optical and geometric error cancels another geometric error.

An imperfect placement of penta prism P relative to compensation point Z produces a beam output displacement error $\epsilon$ as will be discussed with further reference to FIG. 6. Ideally, penta prism P will be displaced from compensation point Z along the beam axis by distance R determined from Equation (1) above. When so positioned, the optical end geometric errors perfectly cancel. However, the penta prism may be displaced from compensation point Z along the beam axis and still produce a displacement error $\epsilon$ well within acceptable limits.

Figure 6:
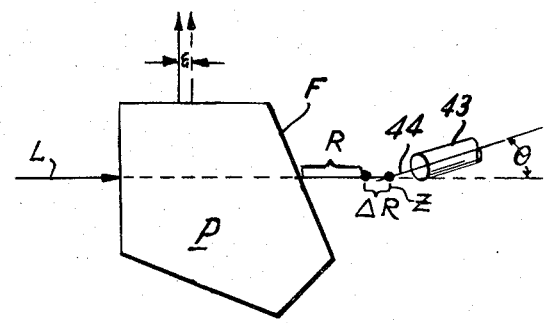
FIG. 6 is a schematic illustration of a penta prism in accordance with the present invention displaced from the compensation point Z by distance R and ΔR, leading to a beam output displacement error ε.

In FIG. 6, penta prism P has an axis of rotation 44 which intersects optical axis L at an angle $\theta$ at point Z. The prism is separated from point Z along the beam axis by distance R, as determined from equation (1), and by some finite displacement error $\Delta R$. Although FIG. 6 shows the prism as being too far from point Z, the analysis holds equally true for the case where the prism is too close to point Z by distance $\Delta R$. Stated mathematically, $\Delta R$ can be positive or negative.

The displacement error $\epsilon$ is a function of $\Delta R$ and $\theta$ and is given as:

$$\epsilon = \Delta R \sin \theta. \qquad (3)$$

From equation (3) it can be seen that for a given tolerance in displacement error (e.g., on the order of thousandths of an inch) the displacement of the prism from point Z need only approximate the distance R when the angle $\theta$ is small. Conversely, the process in accordance with the present invention can be achieved over a very wide range of angles $\theta$ when the prism can be precisely positioned with respect to point Z.

The subject invention provides a simple and error-free means of using a penta prism to sweep out an accurate flat plane. It allows the operator to locate the prism anywhere along the primary laser beam and rapidly and accurately re-erect the prism axis of rotation in such a way as to preclude the various errors to any particular tolerance with the result of a true accurate flat plane may be generated with little skill or knowledge required on the part of the operator.

Accordingly, there is provided a new and improved process for generating or sweeping a flat optical light plane perpendicular to a primary input laser beam emanating from a laser source. In the process of the subject invention, since it has been found impractical to arrange the axis of rotation of a penta prism coincident with the axis of the laser beam in view of available equipment, it has been found that it is merely necessary to obtain a single point about which the penta prism may be rotated in order to generate a flat, true optical light plane. It has been determined that specific point is at the intersection of the axis of rotation of the spindle about which a penta prism is rotated, and where the spindle axis of rotation intersects the axis of the laser beam. It has been determined that the point of compensation, designated Z in FIG. 5, is at a specific geometrical relationship relative to the first reflecting surface of the penta prism, and such geometric relationship is set forth above. In the process of the subject invention, the intersection of the actual axis of rotation of the spindle and the laser beam is determined, after which the penta prism, as mounted in a penta prism module at the specified distance as determined by the above formula, is then rotatably mounted on the spindle. The entrance face of the penta prism is intersected by the primary laser beam, and the first reflecting surface of the penta prism is located approximately at the distance "R" relative to the point of compensation Z. The penta prism is then rotated about said spindle, effectively about the point Z, and is operative to sweep out a flat optical light plane. In the apparatus of the subject invention, there is provided a spindle means having its actual axis of rotation intersecting the primary laser beam at a designated point, i.e., point Z, and the penta prism is rotatably mounted on said spindle means with the laser beam intersecting the entrance face of the penta prism, and the first reflecting surface of the penta prism being located intermediate the laser device and the point at which the actual axis of rotation of the spindle means intersects the primary laser beam.

Although the invention has been described with respect to specific embodiments of the apparatus and process thereof, it is readily apparent that modifications, alterations, or changes may be made therein without departing from the spirit and scope of the invention as defined by the appended claims.

What is claimed is:

1. A process for sweeping a substantially flat optical light plane perpendicular to a primary input laser beam emanating from a laser device and having a displacement error within a predetermined tolerance, comprising:

(a) mounting a solid penta prism having an entrance face and first and second reflecting surfaces on a spindle having an axis of rotation intersecting the laser beam axis at a point Z and at a non-zero angle $\theta$ such that said laser beam intersects said entrance face and said first reflecting surface of said penta prism is located a distance $R + \Delta R$ from point Z along said laser beam axis, R representing the optimum distance between said penta prism and said point Z and given by:

$$R = D[1.707 - 3.414(1 - (1/N'))],$$

where D is the distance that said laser beam traverses within said penta prism between said first and second reflecting surfaces and N' is the index of refraction of said penta prism, $\Delta R$ representing an error distance inducing a displacement error $\epsilon$ in said optical light plane given by:

$$\epsilon = \Delta R \sin \theta;$$

(b) adjusting at least one of $\Delta R$ and $\theta$ such that said displacement error $\epsilon$ is within said predetermined tolerance; and (c) rotating said penta prism about said axis of rotation to produce said light plane.

2. An apparatus for sweeping a substantially flat optical light plane perpendicular to a primary input laser beam and having a displacement error within a predetermined tolerance, comprising:

a laser device for producing said laser beam;

a spindle having an axis of rotation intersecting the laser beam axis at a point Z and at a non-zero angle $\theta$; and a solid penta prism having an entrance face and first and second reflecting surfaces mounted on said spindle such that said laser beam intersects said entrance face and said first reflecting surfaces of said penta prism is located a distance $R + \Delta R$ from point Z along said laser beam axis, R representing the optimum distance between said penta prism and said point Z and given by:

$$R = D[1.707 - 3.414(1 - (1/N')],$$

where D is the distance that said laser beam traverses within said penta prism between said first and second reflecting surfaces and N' is the index of refraction of said penta prism, $\Delta R$ representing an error distance inducing a displacement error $\epsilon$ in said optical light plane given by:

$$\epsilon = \Delta R \sin \theta;$$

said penta prism being mounted on said spindle such that the values of $\theta$ and $\Delta R$ provide said displacement error $\epsilon$ with said predetermined tolerance.

3. A process for sweeping a substantially flat optical light plane perpendicular to a primary input laser beam emanating from a laser device and having a displacement error within a predetermined tolerance, comprising:

(a) mounting a hollow penta prism having an entrance port, and first and second reflecting surfaces on a spindle having an axis of rotation intersecting the laser beam axis at a point Z and at a non-zero angle $\theta$ such that said laser beam enters said entrance port and said first reflecting surface of said penta prism is located a distance $R + \Delta R$ from point Z along said laser beam axis, R representing the optimum distance between said penta prism and said point Z and given by:

$$R = 1.707D,$$

where D is the distance that said laser beam traverses within said penta prism between said first and second reflecting surfaces, $\Delta R$ representing an error distance inducing a displacement error $\epsilon$ in said optical light plane given by:

$$\epsilon = \Delta R \sin \theta;$$

(b) adjusting at least one of $\Delta R$ and $\theta$ such that said displacement error $\epsilon$ is within said predetermined tolerance; and (c) rotating said penta prism about said axis of rotation to produce said light plane.

4. An apparatus for sweeping a substantially flat optical light plane perpendicular to a primary input laser beam and having a displacement error within a predetermined tolerance, comprising:

a laser device for producing said laser beam;

a spindle having an axis of rotation intersecting the laser beam axis at a point Z and at a non-zero angle $\theta$; and a hollow penta prism having an entrance port and first and second reflecting surfaces mounted on said spindle such that said laser beam enters said entrance port and said first reflecting surface of said penta prism is located a distance $R + \Delta R$ from point Z along said laser beam axis, R representing the optimum distance between said penta prism and said point Z and given by:

$$R = 1.707D$$

where D is the distance that said laser beam traverses within said penta prism between said first and second reflecting surfaces, $\Delta R$ representing an error distance inducing a displacement error $\epsilon$ in said optical light plane given by:

$$\epsilon = \Delta R \sin \theta;$$

said penta prism being mounted on said spindle such that the values of $\theta$ and $\Delta R$ provide said displacement error $\epsilon$ within said predetermined tolerance.

5. A process for sweeping a substantially flat optical light plane perpendicular to a primary input laser beam emanating from a laser device and having a displacement error within a predetermined tolerance, comprising:

(a) mounting a penta prism having an entrance face and first and second reflecting surfaces on a spindle having an axis of rotation intersecting the laser beam axis at a point Z and at a non-zero angle such that said laser beam intersects said entrance face and said first reflecting surface of said penta prism is located a particular distance from point Z along said laser beam axis;

(b) adjusting said particular distance along the laser beam axis such that said displacement error is maintained within said predetermined tolerance; and (c) rotating said penta prism about said axis of rotation to produce said light plane.

6. An apparatus for sweeping a substantially flat optical light plane perpendicular to a primary input laser beam and having a displacement error within a predetermined tolerance, comprising:

a laser device for producing said laser beam;

a spindle having an axis of rotation intersecting the laser beam axis at a point Z and at a non-zero angle; and a penta prism having an entrance face and first and second reflecting surfaces mounted on said spindle such that said laser beam intersects said entrance face and said first reflecting surface of said penta prism is located a particular distance from point Z along said laser beam axis, said penta prism being mounted on said spindle to further provide values for said particular distance along said laser beam axis to provide a displacement error within said predetermined tolerance.

* * * * *